US012728831B2

(12) United States Patent
Yoon

(10) Patent No.: US 12,728,831 B2
(45) Date of Patent: Sep. 8, 2026

(54) FLUID PRESSURE SUPPLY APPARATUS

(71) Applicant: HL MANDO CORPORATION, Gyeonggi-do (KR)

(72) Inventor: Ansoo Yoon, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 13 days.

(21) Appl. No.: 18/935,314

(22) Filed: Nov. 1, 2024

(65) Prior Publication Data

US 2025/0146481 A1 May 8, 2025

(30) Foreign Application Priority Data

Nov. 2, 2023 (KR) ........................ 10-2023-0149867

(51) Int. Cl.
*B60T 13/74* (2006.01)
*B60T 8/171* (2006.01)
*B60T 13/16* (2006.01)
*B60T 13/66* (2006.01)

(52) U.S. Cl.
CPC ............ *B60T 13/745* (2013.01); *B60T 8/171* (2013.01); *B60T 13/66* (2013.01); *B60T 13/168* (2013.01)

(58) Field of Classification Search
CPC ........ B60T 8/171; B60T 13/168; B60T 13/66; B60T 13/745
See application file for complete search history.

(56) References Cited

U.S. PATENT DOCUMENTS 10,780,865 B2 * 9/2020 Odaira .................. G01D 5/145
2004/0164611 A1 * 8/2004 Masson .................. B60T 11/16 303/113.4

(Continued)

FOREIGN PATENT DOCUMENTS

DE 102021202710 A1 * 9/2022 ............ B60T 13/745
EP 4 101 707 12/2022

(Continued)

OTHER PUBLICATIONS

DE102021202710A1 machine translation (Year: 2022).*
Extended European Search Report dated Apr. 22, 2025 for European Patent Application No. 24210335.6.

*Primary Examiner* — Matthew Wiblin
(74) *Attorney, Agent, or Firm* — WOMBLE BOND DICKINSON (US) LLP

(57) ABSTRACT

Disclosed is a fluid pressure supply apparatus. The fluid pressure supply apparatus may include a motor including a stator and a rotor, a motion conversion device which converts a rotational motion of the rotor into a linear motion, a piston which is connected to the motion conversion device and performs a linear motion, a housing which includes a cylinder, in which the piston is disposed to perform the linear motion, and a guide extending in a longitudinal direction of the cylinder and inserted into the piston and in which a fluid pressed by the piston is disposed in a space between an inner circumferential surface of the cylinder and an outer circumferential surface of the guide, a first magnet disposed on the piston, and a first magnet sensor which is disposed on the guide and detects a change in a magnetic field of the first magnet according to the linear motion of the piston.

12 Claims, 7 Drawing Sheets

(56) References Cited

U.S. PATENT DOCUMENTS

| | | | | |
|---|---|---|---|---|
| 2015/0033839 | A1* | 2/2015 | Voigtmann | B60T 13/66 73/129 |
| 2018/0009425 | A1* | 1/2018 | Feigel | B60T 13/145 |
| 2019/0100172 | A1* | 4/2019 | Lee | B60T 7/042 |
| 2020/0208698 | A1* | 7/2020 | Kim | F16D 65/18 |

FOREIGN PATENT DOCUMENTS

| | | |
|---|---|---|
| KR | 10-2022-0005911 | 1/2022 |
| KR | 10-2425535 | 7/2022 |
| WO | 89/03782 | 5/1989 |

* cited by examiner

FLUID PRESSURE SUPPLY APPARATUS

CROSS-REFERENCE TO RELATED APPLICATION

This application claims priority to and the benefit of Korean Patent Application No. 10-2023-0149867, filed on Nov. 2, 2023, the disclosures of which is incorporated herein by reference in its entirety.

BACKGROUND

1. Technical Field

The present disclosure relates to a fluid pressure supply apparatus, and more specifically, to an apparatus for supplying a fluid pressure for braking in a brake system of a vehicle.

2. Description of Related Art

A brake is an apparatus for decreasing a speed of a vehicle or maintaining a stop state of a vehicle. Recently, the usage of an electric brake system for electronically controlling the driving of a brake has been increasing.

A fluid pressure for braking in an electric brake system may be supplied by a pump including a motor. A position of a piston which performs a linear motion in the pump according to the rotation of the motor should be accurately measured to control the electric brake system.

Conventionally, a method of indirectly measuring a position of a piston using a unit synchronized with a rotating body of a motor has been generally used. However, such an indirect measuring method has a problem that a possibility of losing position information of the piston due to a malfunction, an S/W execution error, or the like of a sensor is high.

Meanwhile, a structure in which a sensor for measuring a position of a piston is disposed at a side of an electronic control unit (ECU) disposed outside a pump has been conventionally used. Accordingly, there is a problem of an increase in assembly difficulty of the ECU for arranging the sensor at a correct location.

SUMMARY

The present disclosure is intended to solve the above-described problems of the conventional technologies and directed to providing a fluid pressure supply apparatus in which a position of a piston which presses a fluid in a cylinder is accurately measured through a direct method.

In addition, the present disclosure is directed to providing a fluid pressure supply apparatus in which a sensor for measuring a position of a piston which presses a fluid in a cylinder is disposed such that an electronic control unit is easily assembled.

The objects of the present disclosure are not limited to the above-described objects, and other objects that are not mentioned will be able to be clearly understood by those skilled in the art to which the present disclosure pertains from the following description.

In accordance with one aspect of the present disclosure, there is a provided a fluid pressure supply apparatus including a motor including a stator and a rotor, a motion conversion device configured to convert a rotational motion of the rotor into a linear motion, a piston which is connected to the motion conversion device and performs a linear motion, a housing which includes a cylinder, in which the piston is disposed to perform the linear motion, and a guide extending in a longitudinal direction of the cylinder and inserted into the piston and in which a fluid pressed by the piston is disposed in a space between an inner circumferential surface of the cylinder and an outer circumferential surface of the guide, a first magnet disposed on the piston, and a first magnet sensor which is disposed on the guide and detects a change in a magnetic field of the first magnet according to the linear motion of the piston.

In the fluid pressure supply apparatus in accordance with one aspect of the present disclosure, the first magnet may have a ring shape.

In the fluid pressure supply apparatus in accordance with one aspect of the present disclosure, the first magnet may be disposed inside the piston.

In the fluid pressure supply apparatus in accordance with one aspect of the present disclosure, the piston may include a hollow piston body and a seating portion formed to be radially recessed outward in an inner circumferential surface of the piston body, and the first magnet may be disposed on the seating portion.

In the fluid pressure supply apparatus in accordance with one aspect of the present disclosure, one side of the first magnet may be supported by a step of the seating portion.

The fluid pressure supply apparatus in accordance with one aspect of the present disclosure may further include a guide bush which is disposed between the inner circumferential surface of the piston body and the outer circumferential surface of the guide, guides the linear motion of the piston, and is disposed to support the other side of the first magnet.

In the fluid pressure supply apparatus in accordance with one aspect of the present disclosure, the first magnet may be disposed on an outer surface of the piston.

The fluid pressure supply apparatus in accordance with one aspect of the present disclosure may further include a connector assembly disposed in the guide.

In the fluid pressure supply apparatus in accordance with one aspect of the present disclosure, the first magnet sensor may be connected to the connector assembly.

The fluid pressure supply apparatus in accordance with one aspect of the present disclosure may further include a second magnet which is connected to the rotor, disposed on a rotation shaft of the rotor, and rotated along with the rotor.

The fluid pressure supply apparatus in accordance with one aspect of the present disclosure may further include a second magnet sensor which is disposed on the guide and detects a change in a magnetic field according to the rotation of the second magnet.

In accordance with another aspect of the present disclosure, there is a provided a fluid pressure supply apparatus including a motor including a stator and a rotor, a motion conversion device configured to convert a rotational motion of the rotor into a linear motion, a piston which is connected to the motion conversion device and performs a linear motion, a housing which includes a cylinder, in which the piston is disposed to perform the linear motion, and a guide extending in a longitudinal direction of the cylinder and inserted into the piston and in which a fluid pressed by the piston is disposed in a space between an inner circumferential surface of the cylinder and an outer circumferential surface of the guide, a first magnet disposed on the piston, a second magnet which is connected to the rotor, disposed on a rotation shaft of the rotor, and rotated along with the rotor, and a magnet sensor which is disposed in the guide and detects a change in a magnetic field of the first magnet according to the linear motion of the piston or a change in a magnetic field of the second magnet according to rotation of the rotor.

In the fluid pressure supply apparatus in accordance with another aspect of the present disclosure, the first magnet may have a ring shape.

In the fluid pressure supply apparatus in accordance with another aspect of the present disclosure, the piston may include a hollow piston body, and the first magnet may be disposed on an inner circumferential surface of the piston body, on an outer circumferential surface of the piston body, or in the piston body.

The fluid pressure supply apparatus in accordance with another aspect of the present disclosure may further include a connector assembly disposed in the guide, wherein the magnet sensor may be connected to the connector assembly.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Figure 1:
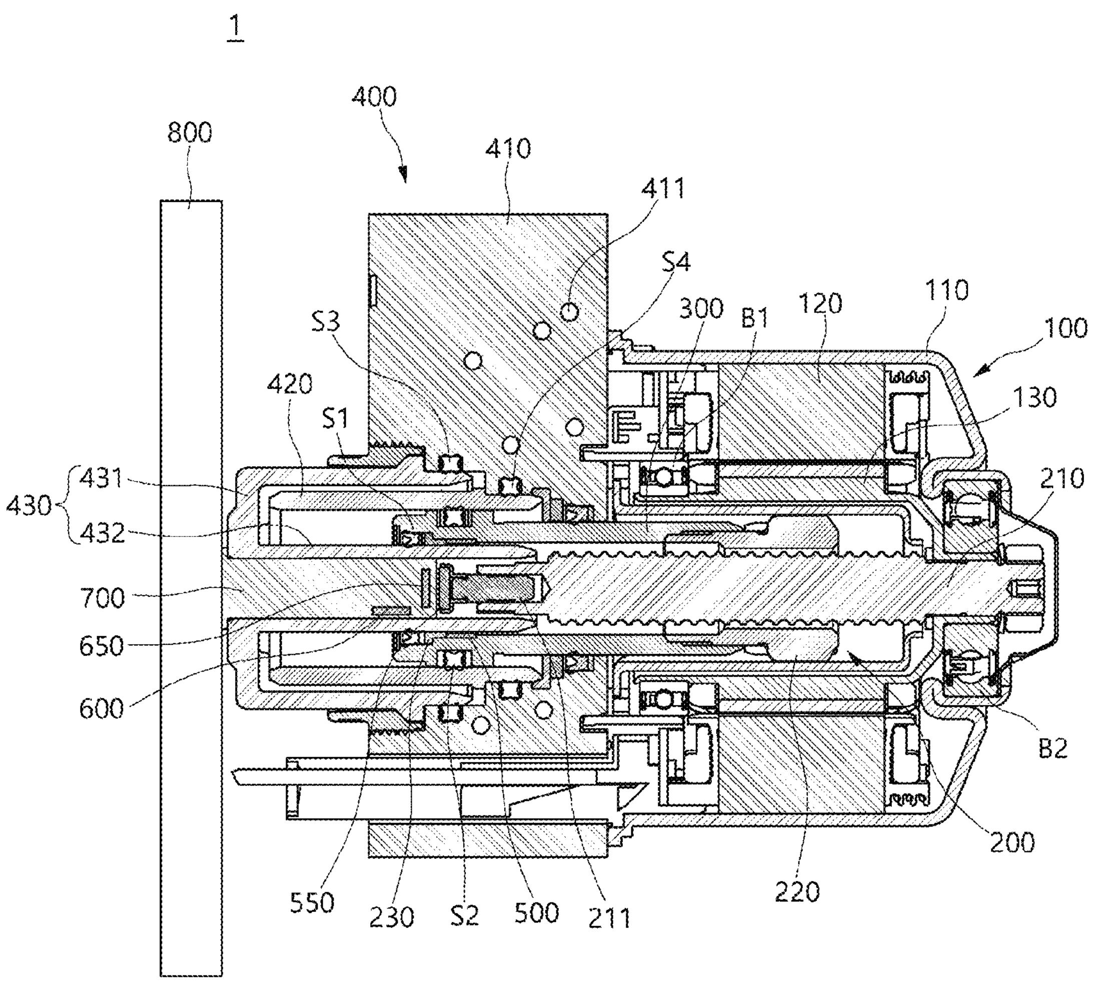
FIG. 1 is a cross-sectional view illustrating a fluid pressure supply apparatus according to one embodiment of the present disclosure.

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings, and the same or similar components are denoted by the same reference numerals throughout the specification.

The words and terms used in the specification and the claims are not limitedly construed as their ordinary or dictionary meanings, and should be construed as meaning and concept consistent with the technical spirit of the present disclosure in accordance with the principle that the inventors can define terms and concepts in order to best describe their disclosure.

In the specification, it should be understood that the terms such as "comprise" or "have" are intended to specify the presence of features, numbers, steps, operations, components, parts, or combinations thereof described in the specification and do not preclude the possibility of the presence or addition of one or more other features, numbers, steps, operations, components, parts, or combinations thereof.

FIG. 1 is a cross-sectional view illustrating a fluid pressure supply apparatus according to one embodiment of the present disclosure. In addition, FIG. 2 is an enlarged view illustrating a portion of FIG. 1.

A fluid pressure supply apparatus 1 according to one embodiment of the present disclosure may be disposed in a brake system of a vehicle and may supply a fluid pressure for braking. More specifically, the fluid pressure supply apparatus 1 according to one embodiment of the present disclosure may be used in an electric brake system for electrically controlling driving of a brake.

Figure 2:
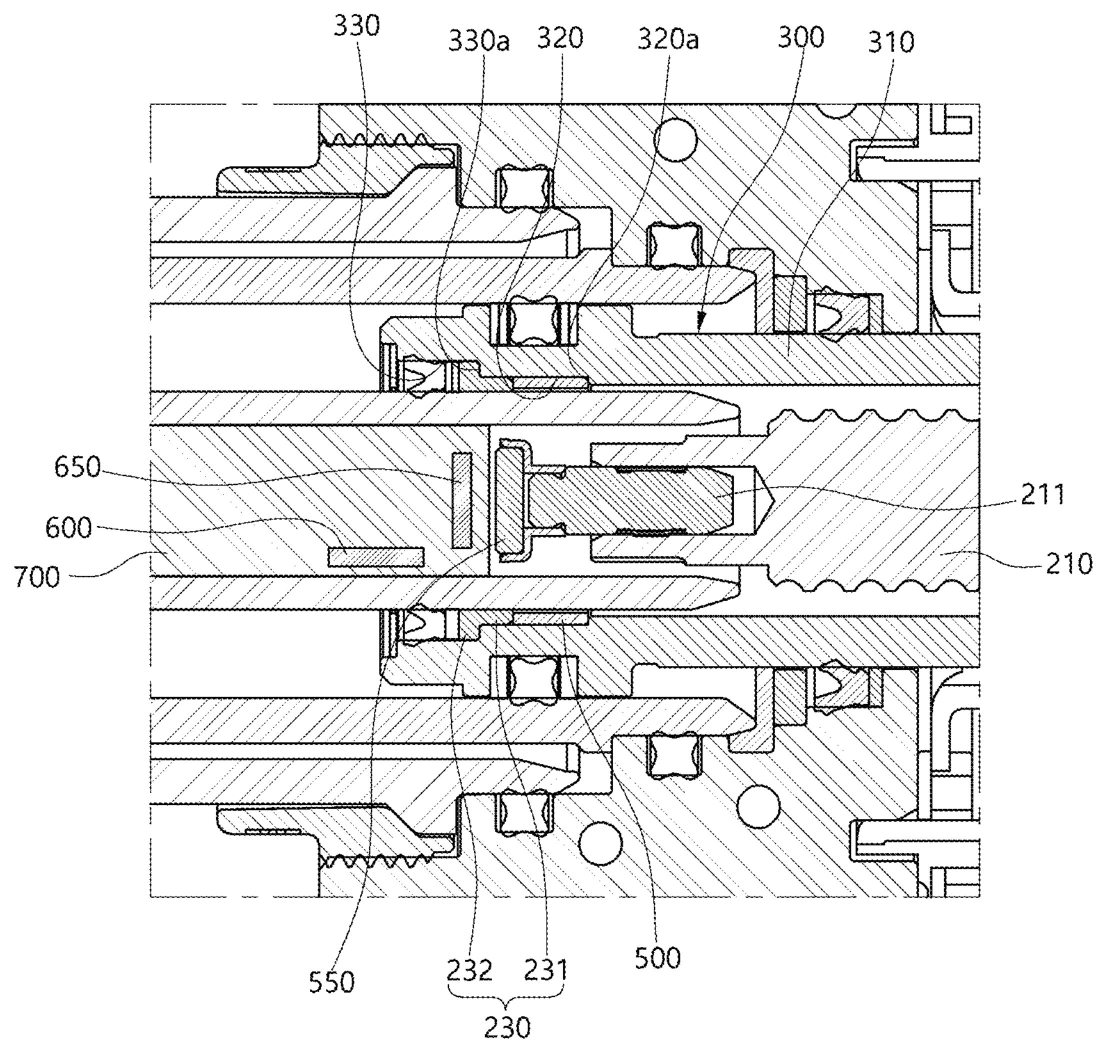
FIG. 2 is an enlarged view illustrating a portion of FIG. 1.

Referring to FIGS. 1 and 2, the fluid pressure supply apparatus 1 according to one embodiment of the present disclosure may include a motor 100, a motion conversion device 200, a piston 300, a housing 400, a first magnet 500, a second magnet 550, a first magnet sensor 600, a second magnet sensor 650, a connector assembly 700, and an electronic control unit (ECU) 800.

The motor 100 receives power and performs a rotational motion. The motor 100 generates power for supplying a fluid pressure. In one embodiment of the present disclosure, the motor 100 includes a stator 120 and a rotor 130 disposed in a motor housing 110. In this case, the motor 100 may be a hollow motor.

A coil (not shown) is wound around the stator 120. The rotor 130 may include magnets disposed at predetermined intervals on an outer circumferential surface. When power is applied to the stator 120, a repulsive force and an attractive force may act between the magnets disposed on the rotor 130 and the coil so that the rotor 130 may rotate.

The motion conversion device 200 converts a rotational motion of the rotor 130 into a linear motion. In one embodiment of the present disclosure, the motion conversion device 200 may include a screw 210 and a nut 220.

The screw 210 is coupled to the rotor 130 and rotates with the rotor 130. The screw 210 may have a predetermined length and may be disposed on a rotation shaft of the motor 100 to rotate with the rotor 130. A first bearing B1 for supporting rotation of the rotor 130 and a second bearing B2 for supporting rotation of the screw 210 may be disposed in the motor housing 110 for the rotation of the rotor 130 and the screw 210.

The nut 220 is coupled to an outer circumferential surface of the screw 210 and converts a rotational motion of the screw 210 into a linear motion. In other words, the nut 220 may perform a linear motion according to rotation of the screw 210.

In one embodiment of the present disclosure, the nut 220 may be coupled to the screw 210 in a ball screw manner and may convert a rotational motion into a linear reciprocating motion. A plurality of balls (not shown) for reducing friction may be disposed between the nut 220 and the screw 210. That is, the motion conversion device 200 may be provided in a ball-screw type.

The piston 300 is connected to the motion conversion device 200 and performs a linear motion. In one embodiment of the present disclosure, the piston 300 may be connected to the nut 220. More specifically, the piston 300 may be connected to the nut 220 of the motion conversion device 200 and perform the linear motion with the nut 220.

When the piston 300 performs a linear motion in one direction, a fluid may be pressed, and a fluid pressure may be supplied. In addition, when the piston 300 performs a linear motion in the other direction, the pressing pressure against the fluid may be reduced, and the fluid pressure may be lowered.

The piston 300 is formed in a hollow shape. More specifically, the piston 300 may have a cylindrical piston body 310. A guide 432 of the housing 400, the first magnet 500, which will be described below, and the like may be disposed in the piston body 310.

In one embodiment of the present disclosure, the piston 300 may include a seating portion 320 radially recessed outward in an inner circumferential surface of the piston 300. More specifically, the seating portion 320 may be formed to be radially recessed outward in an inner circumferential surface of the piston body 310.

The housing 400 accommodates the fluid pressed by the piston 300. In addition, the housing 400 may include one or more passages 411 to which a hydraulic pressure generated according to a linear motion of the piston 300 is supplied. The housing 400 is disposed on one side of the motor 100. The housing 400 may be connected to the motor 100. Specifically, the housing 400 may be fastened to the motor housing 110.

In one embodiment of the present disclosure, the housing 400 may include a housing block 410, a cylinder 420, and the guide 432.

The housing block 410 may include one or more passages 411 through which the fluid pressed by the piston 300 may flow. The housing block 410 may be fastened to the motor housing 110. In addition, the cylinder 420 and the guide 432 may be disposed in the housing block 410.

The piston 300 is disposed to perform a linear motion in the cylinder 420. In one embodiment of the present disclosure, the cylinder 420 may have a shape of which both one end and the other end are open in a longitudinal direction. In FIG. 1, when a right side is defined as a front side, and a left side is defined as a rear side, the cylinder 420, of which the front side and the rear side are open, is coupled to the housing block 410. The piston 300 may enter the cylinder 420 through the rear side of the cylinder 420.

The guide 432 extends in the longitudinal direction of the cylinder 420 and is inserted into the piston 300. More specifically, the guide 432 may be inserted into the piston body 310 through a front side of the piston body 310.

The fluid pressed by the piston 300 may be disposed in a space between an inner circumferential surface of the cylinder 420 and an outer circumferential surface of the guide 432. Meanwhile, the fluid disposed in the space between the inner circumferential surface of the cylinder 420 and the outer circumferential surface of the guide 432 may be supplied to the passage 411 of the housing block 410 communicating with the cylinder 420.

The guide 432 supports the piston 300 such that a linear motion of the piston 300 may be stably performed. The guide 432 provides a support force such that the piston 300 stably moves along a linear motion passage inside the body 310 of the piston 300.

In one embodiment of the present disclosure, the guide 432 may be formed in a pipe shape. Accordingly, the first magnet sensor 600, the second magnet sensor 650, and the like may be disposed in the guide 432.

The cylinder cover 430 covers the open front side of the cylinder 420 and is coupled to the housing block 410. In one embodiment of the present disclosure, the guide 432 may be integrally provided with the cylinder cover 430. In other words, the cylinder cover 430 may cover the open front side of the cylinder 420 and provide the guide 432 inside the cylinder 420 at the same time.

Figure 3:
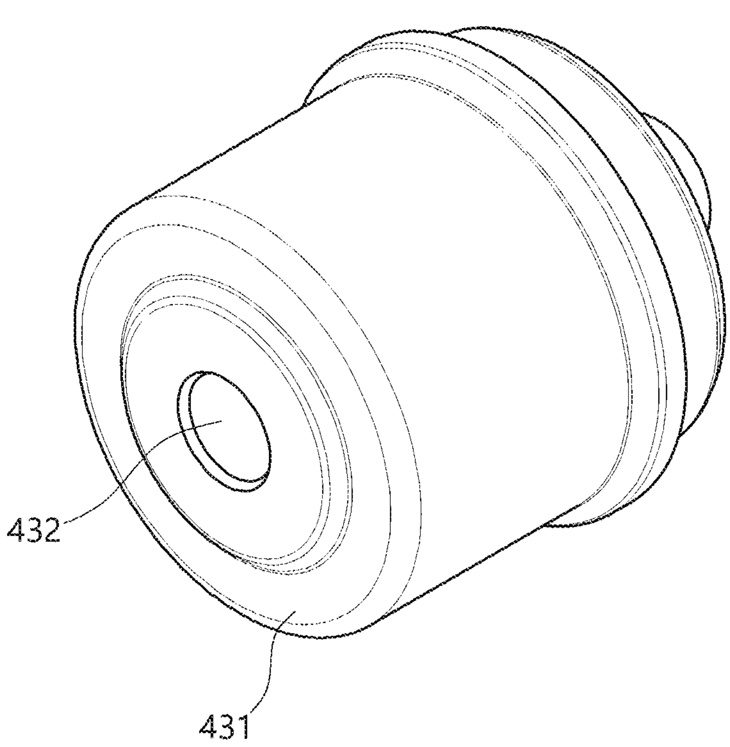
FIG. 3 is a front perspective view illustrating a cylinder cover of a housing of the fluid pressure supply apparatus according to one embodiment of the present disclosure.

FIG. 3 is a front perspective view illustrating the cylinder cover of the housing of the fluid pressure supply apparatus according to one embodiment of the present disclosure. In addition, FIG. 4 is a rear perspective view illustrating the cylinder cover of the housing of the fluid pressure supply apparatus according to one embodiment of the present disclosure.

Figure 4:
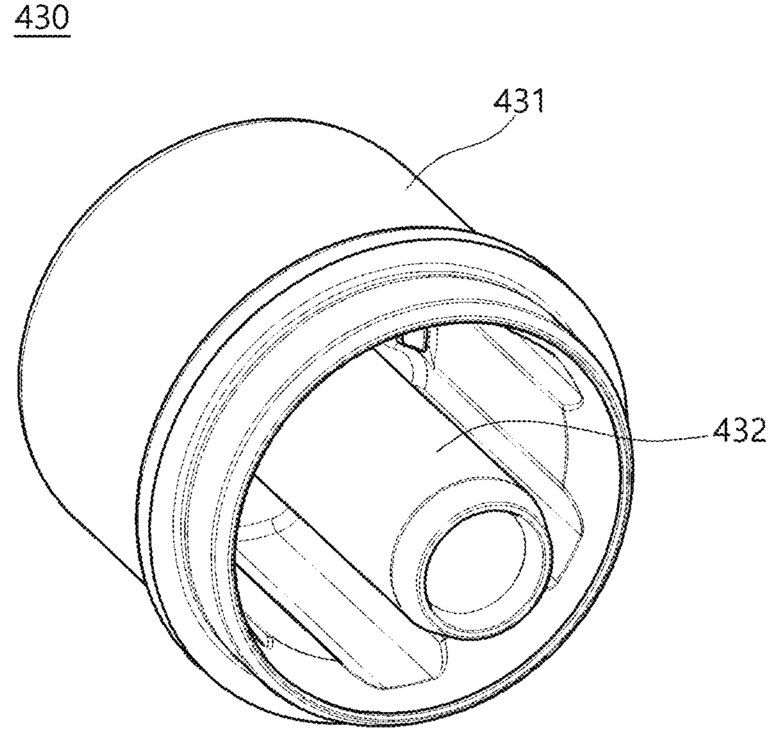
FIG. 4 is a rear perspective view illustrating the cylinder cover of the housing of the fluid pressure supply apparatus according to one embodiment of the present disclosure.

Referring to FIGS. 3 and 4, the cylinder cover 430 includes a cylinder cover body 431 having a cup shape covering the open front side of the cylinder 420 and the guide 432, which extends in the longitudinal direction, inside the cylinder cover body 431 and has the pipe shape passing through a floor surface of the cylinder cover body 431. Through this structure, the cylinder cover 430 may close the cylinder 420 and provide the guide 432 inside the cylinder 420 at the same time.

Leakage of the fluid disposed in the cylinder 420 needs to be prevented. To this end, one or more sealing members may be disposed in the fluid pressure supply apparatus 1 according to one embodiment of the present disclosure.

As illustrated in FIG. 1, a first sealing member S1 may be disposed between the inner circumferential surface of the piston 300 and the outer circumferential surface of the guide 432 to prevent the fluid from being introduced into the piston 300 through a space between the inner circumferential surface of the piston 300 and the outer circumferential surface of the guide 432. In addition, a second sealing member S2 may be disposed between an outer circumferential surface of the piston 300 and the inner circumferential surface of the cylinder 420 to prevent the fluid from being leaked to the outside of the cylinder 420 through a space between the outer circumferential surface of the piston 300 and the inner circumferential surface of the cylinder 420. In addition, a third sealing member S3 may be disposed between the housing block 410 and the cylinder cover 430. In addition, a fourth sealing member S4 may be disposed between the housing block 410 and the cylinder 420.

For example, the first sealing member S1, the second sealing member S2, the third sealing member S3, and the fourth sealing member S4 may be O-rings.

The first magnet 500 is disposed on the piston 300 and performs a linear motion with the piston 300. A present position of the piston 300 may be measured through a change in a magnetic field according to displacement of the first magnet 500. In one embodiment of the present disclosure, the change in the magnetic field according to the displacement of the first magnet 500 may be detected by the first magnet sensor 600.

In the present disclosure, the first magnet 500 may be disposed to perform a linear motion with the piston 300, and a current position of the piston 300 may be calculated on the basis of the change in the magnetic field of the first magnet 500. Accordingly, a risk of error occurrence of a conventional method of indirectly measuring a position of a piston using a unit synchronized with a rotating body of a motor can be avoided.

The first magnet 500 may have a ring shape. The first magnet 500 may have any of various shapes rather than the ring shape. For example, the first magnet 500 may also be formed in a rod shape. In this case, a plurality of first magnets 500 may also be disposed at predetermined intervals in a circumferential direction of the piston 300.

The first magnet 500 may be disposed on the inner circumferential surface of the piston 300. Referring to FIG. 2, the piston 300 may include the seating portion 320 formed to be radially recessed outward in the inner circumferential surface of the piston 300. In this case, the first magnet 500 may be disposed on the seating portion 320.

The seating portion 320 may be formed to be radially recessed outward in the inner circumferential surface of the piston body 310, and the first magnet 500 may have the ring shape having an outer diameter corresponding to an inner diameter of the seating portion 320.

Meanwhile, one side of the first magnet 500 in the longitudinal direction may be supported by a step 320*a* of the seating portion 320. More specifically, in FIG. 2, when a right side is defined as a front side, and a left side is defined as a rear side, the seating portion 320 may be formed to include the step 320*a* on the rear side. In addition, a step having a shape radially protruding inward is not disposed on a front side of the seating portion 320. Accordingly, a rear side of the first magnet 500 may be supported by the step 320*a* of the seating portion 320. This structure allows the first magnet 500 to be easily inserted into the piston 300 and the first magnet 500 to be stably supported at the same time.

In this regard, the fluid pressure supply apparatus 1 according to one embodiment of the present disclosure may further include a guide bush 230. The guide bush 230 is disposed between the inner circumferential surface of the piston 300 and the outer circumferential surface of the guide 432 and guides a linear motion of the piston 300. In addition, the guide bush 230 is disposed to support the other side of the first magnet 500 in the longitudinal direction (a front side of the first magnet 500 based on an orientation of FIG. 2).

Referring to FIG. 2, the piston 300 may include an enlarged diameter portion 330 which is adjacent to the front side of the seating portion 320 and is radially recessed outward further in the inner circumferential surface of the piston body 310. A step 330*a* of the enlarged diameter portion 330 is formed between the enlarged diameter portion 330 and the seating portion 320.

The guide bush 230 may include a cylindrical guide bush body 231 having an outer diameter corresponding to the inner diameter of the seating portion 320 and a flange 232 radially enlarged outward from one end of the guide bush body 231 in the longitudinal direction. An outer diameter of the flange 232 may correspond to an inner diameter of the enlarged diameter portion 330.

In a state in which the first magnet 500 is inserted into the piston 300 and the rear side of the first magnet 500 is supported by the step 320*a* of the seating portion 320, the guide bush 230 may be inserted into the piston 300. The guide bush body 231 of the guide bush 230 is disposed on the seating portion 320 and supports the front side of the first magnet 500, and the flange 232 of the guide bush 230 is hooked on the step 330*a* of the enlarged diameter portion 330.

In one embodiment of the present disclosure, the guide bush 230 may have an inner diameter corresponding to an outer diameter of the guide 432, may be disposed in the piston 300, and may serve to improve stability of a linear motion of the piston 300 and to support the front side of the first magnet 500 at the same time. Accordingly, arrangement stability of the first magnet 500 can be further improved.

The second magnet 550 is disposed on a rotation shaft of the rotor 130 and rotates with the rotor 130. For example, the second magnet 550 may have a disk shape.

A rotating position of the motor 100 may be measured through a change in a magnetic field according to the rotation of the second magnet 550. In one embodiment of the present disclosure, the change in the magnetic field according to the rotation of the second magnet 550 may be detected by the second magnet sensor 650.

As described above, in one embodiment of the present disclosure, the motion conversion device 200 includes the screw 210 coupled to the rotor 130 and rotated along with the rotor 130. The second magnet 550 may be coupled onto the screw 210. More specifically, the second magnet 550 may be coupled to the screw 210 on a rotation shaft of the screw 210.

In one embodiment of the present disclosure, a magnet holder 211 for arranging the second magnet 550 may be coupled to one end (a front side) of the screw 210 in the longitudinal direction. The magnet holder 211 may be formed as a rod having one end to which the second magnet 550 may be fixed.

The first magnet sensor 600 is disposed in the guide 432 and detects a change in a magnetic field of the first magnet 500 according to a linear motion of the piston 300. For example, the first magnet sensor 600 may be disposed on an inner circumferential surface of the guide 432.

A current position of the piston 300 may be checked through a change in a magnetic field according to displacement of the first magnet 500 measured by the first magnet sensor 600. In the present disclosure, the first magnet sensor 600 may detect a change in a magnetic field due to the first magnet 500 which performs a linear motion with the piston 300 to directly measure a displacement extent of the piston 300. Accordingly, as described above, a problem of the conventional method of indirectly measuring the position of the piston using the unit synchronized with the rotating body of the motor can be solved.

The second magnet sensor 650 is disposed in the guide 432 and detects a change in a magnetic field of the second magnet 550 according to rotation of the rotor 130. The second magnet sensor 650 may be disposed on the rotation shaft of the rotor 130. In other words, the second magnet sensor 650 may be disposed on the rotation shaft of the screw 210.

A rotating position of the motor 100 may be measured through a change in a magnetic field according to the rotation of the second magnet 550 measured by the second magnet sensor 650. Conventionally, a method of estimating a current position of a piston 300 through a change in a magnetic field measured by a second magnet sensor 650 is used. However, as described above, in the present disclosure, since a position of the piston 300 may be determined on the basis of a change in a magnetic field of the first magnet 500 which performs a linear motion with the piston 300, even when an error occurs in the second magnet sensor 650, there is no problem in checking the position of the piston 300.

Meanwhile, in the present disclosure, the first magnet sensor 600 and the second magnet sensor 650 are disposed in the guide 432 of the housing 400. Accordingly, the placement and arrangement of the sensors are easy when compared to a case in which sensors are disposed outside a housing 400.

Conventionally, a magnet sensor is generally disposed to be coupled to a printed circuit board of an ECU disposed outside a housing of a fluid pressure supply apparatus. In this case, it is difficult to arrange the magnet sensor at a correct location, and the difficulty of arrangement and assembly increases. However, in the present disclosure, as the first magnet sensor 600 and the second magnet sensor 650 are disposed in the housing 400, arrangement and assembly of the sensors are easy and are effectively performed.

The connector assembly 700 is disposed in the guide 432. The connector assembly 700 may transmit measurement information of the first magnet sensor 600 and measurement information of the second magnet sensor 650 to the ECU 800.

In one embodiment of the present disclosure, the first magnet sensor 600 and the second magnet sensor 650 may be connected to the connector assembly 700. That is, the first magnet sensor 600 and the second magnet sensor 650 may be connected to the connector assembly 700 and disposed in the guide 432.

The connector assembly 700 may allow arrangement of the first magnet sensor 600 and the second magnet sensor 650 to be easier. In addition, some components disposed on the printed circuit board of the ECU disposed outside the housing of the conventional fluid pressure supply apparatus may be allowed to be disposed in the housing 400.

The ECU 800 is connected to the connector assembly 700 and disposed at one side of the housing 400. The ECU 800 receives the measurement information of the first magnet sensor 600 and the measurement information of the second magnet sensor 650. In addition, the ECU 800 may control rotation of the motor 100.

As described above, in the present disclosure, the first magnet sensor 600 and the second magnet sensor 650 are not disposed in the ECU 800. In addition, some components on the printed circuit board disposed outside the housing of the conventional fluid pressure supply apparatus may also be disposed on the connector assembly 700 disposed in the housing 400. Accordingly, a weight of the ECU 800 may decrease. In addition, assembly and arrangement of the ECU 800 can be easy.

Figure 5:
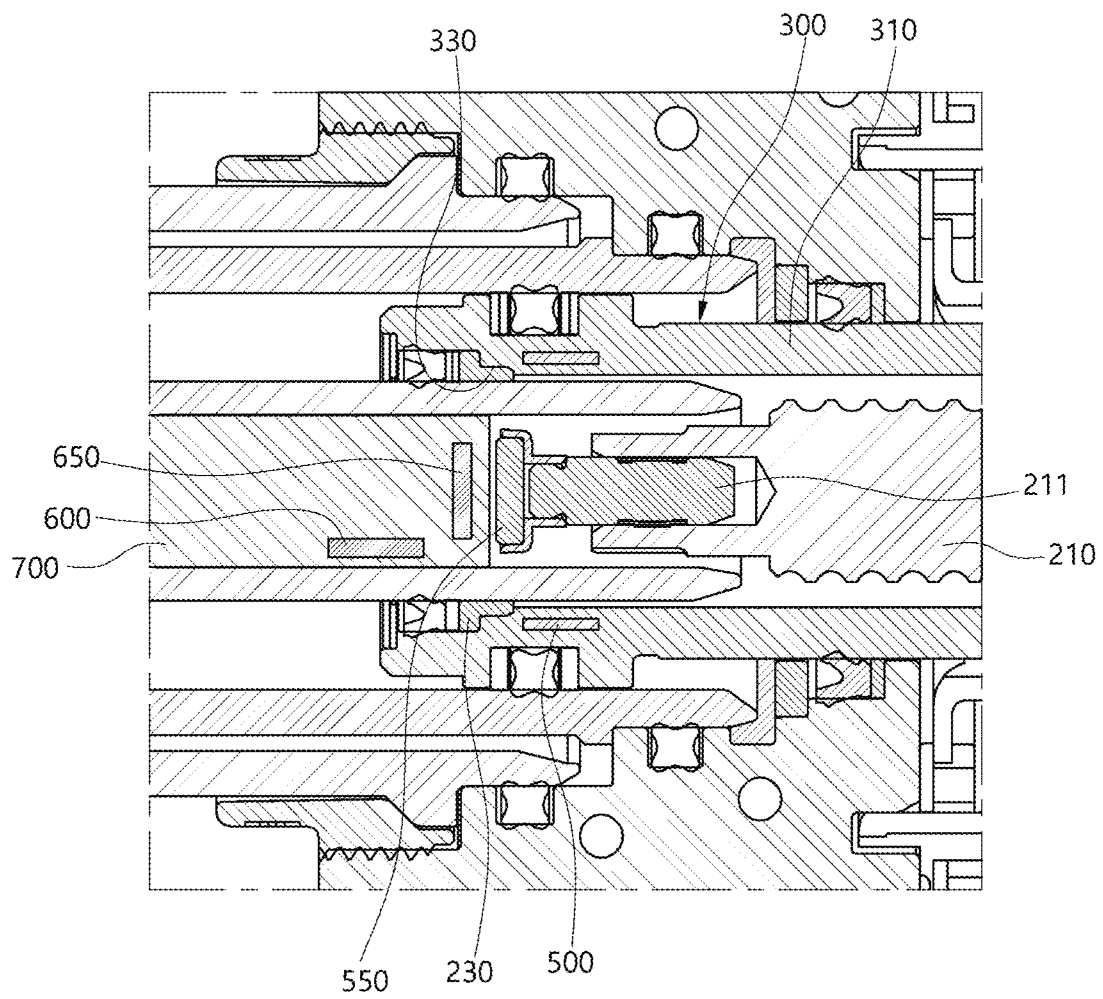
FIG. 5 is a view illustrating a modified example of the fluid pressure supply apparatus according to one embodiment of the present disclosure.

FIG. 5 is a view illustrating a modified example of the fluid pressure supply apparatus according to one embodiment of the present disclosure.

Referring to FIG. 5, in a modified example of the fluid pressure supply apparatus 1 according to one embodiment of the present disclosure, a first magnet 500 may be disposed in a wall of a piston 300. More specifically, the first magnet 500 may be disposed in a wall of a piston body 310 of the piston 300. For example, the first magnet 500 may be integrally molded with the piston 300.

According to the modified example, the first magnet 500 is not externally exposed. Accordingly, corrosion and the like of the first magnet 500 can be effectively prevented.

Figure 6:
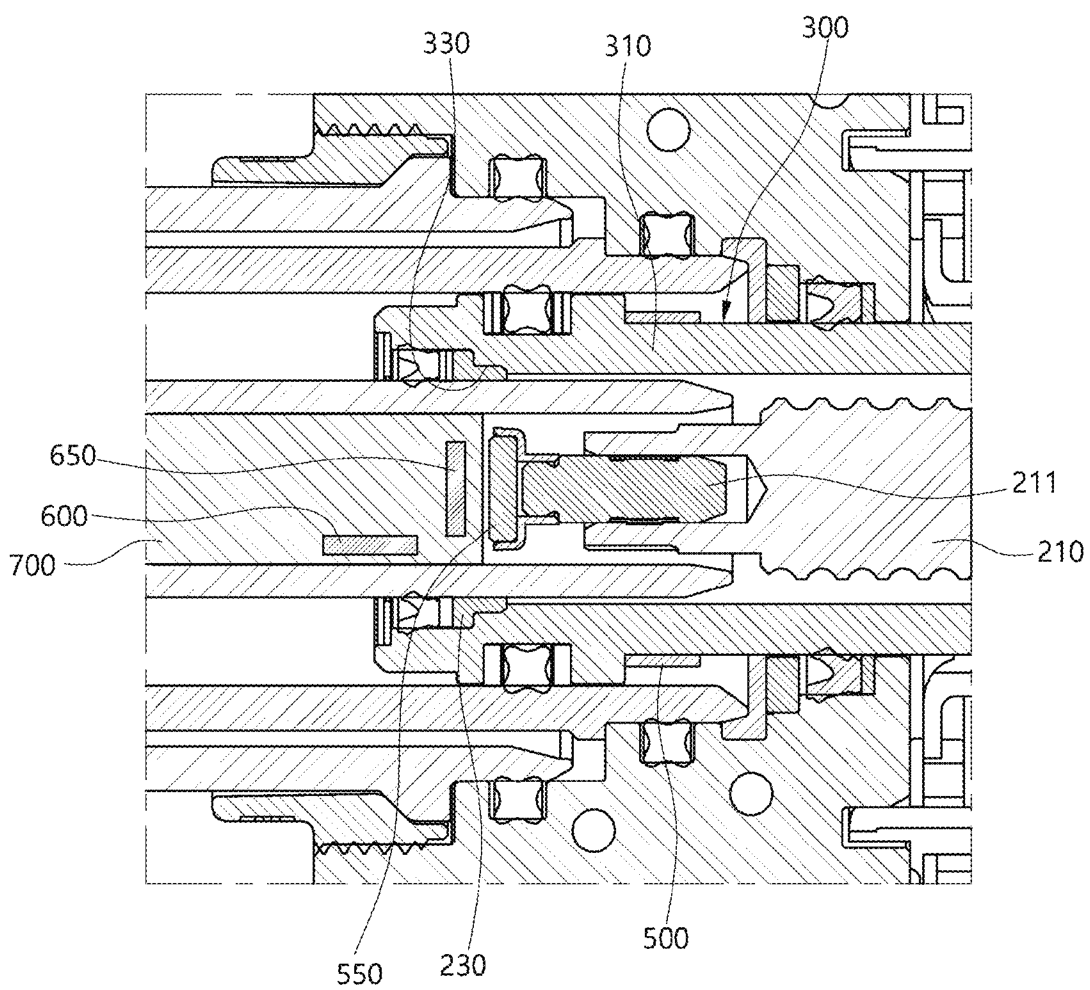
FIG. 6 is a view illustrating another modified example of the fluid pressure supply apparatus according to one embodiment of the present disclosure.

FIG. 6 is a view illustrating another modified example of the fluid pressure supply apparatus according to one embodiment of the present disclosure.

Referring to FIG. 6, in a modified example of the fluid pressure supply apparatus 1 according to one embodiment of the present disclosure, a first magnet 500 may be disposed on an outer circumferential surface of a piston 300. More specifically, the first magnet 500 may be disposed on an outer circumferential surface of a wall of a piston body 310 of the piston 300.

In this case, the first magnet 500 may have a ring shape. Specifically, the first magnet 500 may have an inner diameter corresponding to an outer diameter of a portion of the piston body 310 on which the first magnet 500 is disposed.

According to the modified example, a seating portion for arranging the first magnet 500 does not need to be formed in the piston 300. Accordingly, a structure of the piston 300 can be simplified. In addition, machining efficiency of the piston 300 can be improved.

Figure 7:
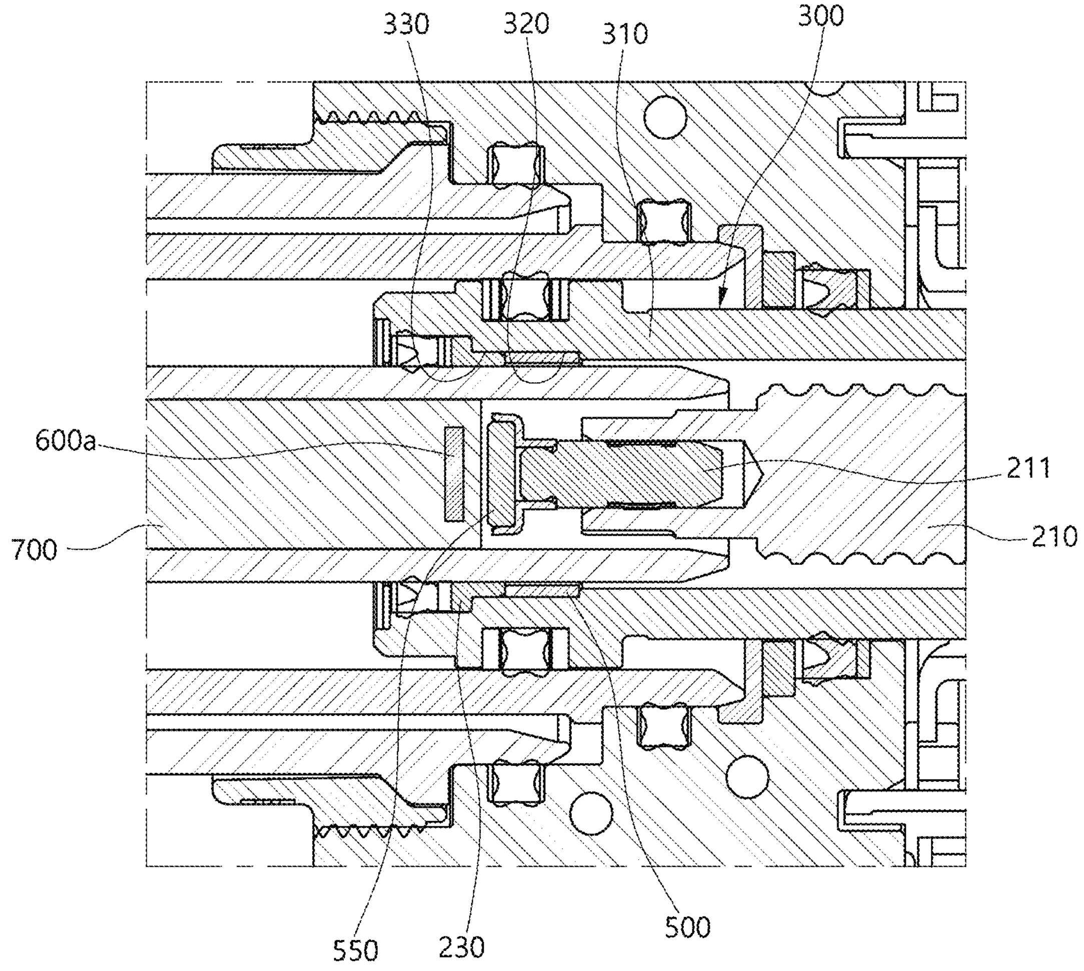
FIG. 7 is a view illustrating still another modified example of the fluid pressure supply apparatus according to one embodiment of the present disclosure.

FIG. 7 is a view illustrating still another modified example of the fluid pressure supply apparatus according to one embodiment of the present disclosure. In the modified example of the fluid pressure supply apparatus 1 according to one embodiment of the present disclosure, there is a difference in that a first magnet sensor 600 and a second magnet sensor 650 have one magnet sensor 600*a* without each having a magnet sensor 600*a*, when compared to one embodiment of the present disclosure.

In the modified example of FIG. 7, the magnet sensor 600*a* is disposed in a guide 432 and detects a change in a magnetic field of a first magnet 500 according to a linear motion of a piston 300. In addition, the magnet sensor 600*a* is disposed on a rotation shaft of a rotor 130 and detects a change in a magnetic field of a second magnet 550 which rotates with the rotor 130 at the same time.

In this case, the magnet sensor 600*a* may be disposed on the rotation shaft of the rotor 130. More specifically, the magnet sensor 600*a* may be disposed adjacent to the second magnet 550 on a rotation shaft of a screw 210.

According to the modified example, since the change in the magnetic field due to the first magnet 500 and the change in the magnetic field due to the second magnet 550 may be measured by the magnet sensor 600*a* at the same time, the number of magnet sensors can be reduced. Accordingly, economic improvement through reduction of the number of components can be expected.

In a fluid pressure supply apparatus according to the present disclosure, a position of a piston can be directly and accurately measured by measuring a change in a magnetic field due to a magnet which performs a linear motion with the piston which presses a fluid in a cylinder.

In addition, in the fluid pressure supply apparatus according to the present disclosure, a sensor can be efficiently disposed at a correct position and an ECU can be easily assembled using a structure in which the sensor for measuring the position of the piston which presses the fluid in the cylinder is disposed in the cylinder.

It should be understood that the effects of the present disclosure are not limited to the above-described effects, and include all effects inferable from a configuration of the disclosure described in detailed descriptions or claims of the present disclosure. Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this will also be included within the scope of the spirit of the present disclosure.

What is claimed is:

1. A fluid pressure supply apparatus comprising:
- a motor including a stator and a rotor;
- a motion conversion device configured to convert a rotational motion of the rotor into a linear motion;
- a piston which is connected to the motion conversion device and performs a linear motion;
- a housing which includes a cylinder, in which the piston is disposed to perform the linear motion, and a guide extending in a longitudinal direction of the cylinder and inserted into the piston and in which a fluid pressed by the piston is disposed in a space between an inner circumferential surface of the cylinder and an outer circumferential surface of the guide;
- a first magnet comprised in the piston;
- a first magnet sensor which is disposed on the guide and detects a change in a magnetic field of the first magnet according to the linear motion of the piston; and
- a connector assembly disposed in the guide.

2. The fluid pressure supply apparatus of claim 1, wherein the first magnet has a ring shape.

3. The fluid pressure supply apparatus of claim 1, wherein:

the piston includes a hollow piston body and a seating portion formed to be radially recessed outward in an inner circumferential surface of the piston body; and the first magnet is disposed on the seating portion.

4. The fluid pressure supply apparatus of claim 3, wherein one side of the first magnet is supported by a step of the seating portion.

5. The fluid pressure supply apparatus of claim 4, further comprising a guide bush which is disposed between the inner circumferential surface of the piston body and the outer circumferential surface of the guide, guides the linear motion of the piston, and is disposed to support another side of the first magnet.

6. The fluid pressure supply apparatus of claim 1, wherein the motion conversion device comprises a screw and a nut, and the fluid pressure supply apparatus further comprises a second magnet which is connected to the screw, disposed on a rotation shaft of the screw, and rotated along with the screw.

7. The fluid pressure supply apparatus of claim 6, further comprising a second magnet sensor which is disposed on the guide and detects a change in a magnetic field according to the rotation of the second magnet.

8. A fluid pressure supply apparatus comprising:

a motor including a stator and a rotor;

a motion conversion device configured to convert a rotational motion of the rotor into a linear motion;

a piston which is connected to the motion conversion device and performs a linear motion;

a housing which includes a cylinder, in which the piston is disposed to perform the linear motion, and a guide extending in a longitudinal direction of the cylinder and inserted into the piston and in which a fluid pressed by the piston is disposed in a space between an inner circumferential surface of the cylinder and an outer circumferential surface of the guide;

a first magnet comprised in the piston;

a first magnet sensor which is disposed on the guide and detects a change in a magnetic field of the first magnet according to the linear motion of the piston wherein the first magnet sensor is connected to a connector assembly.

9. A fluid pressure supply apparatus comprising:

a motor including a stator and a rotor;

a motion conversion device configured to convert a rotational motion of the rotor into a linear motion;

a piston which is connected to the motion conversion device and performs a linear motion;

a housing which includes a cylinder, in which the piston is disposed to perform the linear motion, and a guide extending in a longitudinal direction of the cylinder and inserted into the piston and in which a fluid pressed by the piston is disposed in a space between an inner circumferential surface of the cylinder and an outer circumferential surface of the guide;

a first magnet comprised in the piston;

a second magnet which is connected to the rotor, disposed on a rotation shaft of the rotor, and rotated along with the rotor; and a magnet sensor which is disposed in the guide and detects a change in a magnetic field of the first magnet according to the linear motion of the piston or a change in a magnetic field of the second magnet according to rotation of the rotor.

10. The fluid pressure supply apparatus of claim 9, wherein the first magnet has a ring shape.

11. The fluid pressure supply apparatus of claim 9, wherein:

the piston includes a hollow piston body; and the first magnet is disposed on an inner circumferential surface of the piston body, on an outer circumferential surface of the piston body, or in the piston body.

12. The fluid pressure supply apparatus of claim 9, further comprising a connector assembly disposed in the guide, wherein the magnet sensor is connected to the connector assembly.

* * * * *